US011082663B2

(12) United States Patent
Slama et al.

(10) Patent No.: US 11,082,663 B2
(45) Date of Patent: Aug. 3, 2021

(54) IMAGING SYSTEM

(71) Applicant: SMR Patents S.à.r.l., Luxembourg (LU)

(72) Inventors: Alexander Slama, Stuttgart (DE); Benjamin Samson, Stuttgart (DE); Jean-Sebastian Samson, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 17/007,690

(22) Filed: Aug. 31, 2020

(65) Prior Publication Data

US 2020/0404220 A1 Dec. 24, 2020

Related U.S. Application Data

(63) Continuation-in-part of application No. 16/145,695, filed as application No. PCT/EP2017/057228 on Mar. 27, 2017, now Pat. No. 10,764,484.

(30) Foreign Application Priority Data

Apr. 4, 2016 (DE) ...................... 10 2016 106 126.3

(51) Int. Cl.
*B60R 1/06* (2006.01)
*B60R 11/04* (2006.01)
(Continued)

(52) U.S. Cl.
CPC ................. *H04N 7/18* (2013.01); *B60R 1/06* (2013.01); *B60R 1/088* (2013.01); *B60R 11/04* (2013.01);
(Continued)

(58) Field of Classification Search
CPC .... H04N 5/2254; H04N 5/2259; B60R 11/04; B60R 2001/1253; G02B 27/1066; G02B 27/14
See application file for complete search history.

(56) References Cited

U.S. PATENT DOCUMENTS 6,885,414 B1 * 4/2005 Li ....................... G02F 1/13471
349/113
6,999,649 B1 * 2/2006 Chen ........................ G02F 1/07
349/177

(Continued)

FOREIGN PATENT DOCUMENTS

DE 203 09 891 U1 9/2003

OTHER PUBLICATIONS

International Search Report and Written Opinion dated Jul. 10, 2017 of International application No. PCT/EP2017/057228.

*Primary Examiner* — Daniel M Pasiewicz
(74) *Attorney, Agent, or Firm* — Jones Day (57) ABSTRACT

An imaging system for a vehicle includes an image sensor for detecting electromagnetic radiation, a first lens unit and a second lens unit for focusing electromagnetic radiation, and at least one transflective or switchable mirror unit, with the at least one transflective or switchable mirror unit being configured to project electromagnetic radiation from at least one of the first lens unit and the second lens unit essentially perpendicularly on the image sensor, where the first lens unit has a first optical axis and the second lens unit has a second optical axis crossing the first optical axis at a crossing point, and the at least one transflective or switchable mirror unit is arranged between the image sensor, the first lens unit, and the second lens unit at the crossing point.

15 Claims, 5 Drawing Sheets

(51) Int. Cl.
*H04N 5/225* (2006.01)
*B60R 1/08* (2006.01)
*B60R 11/00* (2006.01)
*H04N 7/18* (2006.01)
*G02F 1/137* (2006.01)
*G02F 1/133* (2006.01)

(52) U.S. Cl.
CPC .......... *G02F 1/137* (2013.01); *G02F 1/13318* (2013.01); *H04N 5/2254* (2013.01); *B60R 2011/004* (2013.01); *G02F 2203/09* (2013.01); *H04N 5/2252* (2013.01)

(56) References Cited

U.S. PATENT DOCUMENTS

| | | |
|---|---|---|
| 8,305,204 B2 | 11/2012 | Nagamine et al. |
| 8,643,748 B2 | 2/2014 | He et al. |
| 8,937,651 B2 | 1/2015 | Guissin et al. |
| 9,407,819 B2 | 8/2016 | Guissin et al. |
| 10,764,484 B2 * | 9/2020 | Slama .................. H04N 5/2254 |
| 2004/0201559 A1 * | 10/2004 | Takaoka .............. G02F 1/13306 345/87 |
| 2009/0128664 A1 * | 5/2009 | He ..................... H04N 5/23245 348/240.1 |

* cited by examiner

IMAGING SYSTEM

CROSS-REFERENCE TO RELATED APPLICATIONS

This application is a continuation-in-part of U.S. patent application Ser. No. 16/145,695, filed Sep. 28, 2018, which is a National Stage entry of International Patent Application No. PCT/EP2017/057228, filed Mar. 27, 2017, which claims the benefit of priority to German Patent Application No. DE 10 2016 106 126.3, filed Apr. 4, 2016, each of which is incorporated by reference herein in its entirety for all purposes.

BACKGROUND OF THE INVENTION

1. Field of the Invention

The following description relates to an imaging system for use in an automotive environment. The imaging system includes an image sensor for detecting electromagnetic radiation, a first lens unit and a second lens unit for focusing electromagnetic radiation, and at least one transflective unit with the transflective unit being configured to project electromagnetic radiation from the first lens unit and/or from the second lens unit essentially perpendicularly on the image sensor.

2. Related Art

In modern day vehicles, conventional mirrors are often replaced with camera based systems. It has been recognized that the vehicle mirrors currently used have several disadvantages. Conventional mirrors often offer the driver a very limited perspective on the environment of the vehicle's so-called "blind spots" which can only be compensated through additional mirrors. Also, vehicle mirrors have a negative impact on the design and the aerodynamic characteristics of the vehicle. Therefore, vehicles often employ vision systems where the images of cameras on the left-hand side, right-hand side, the front and the back of the vehicle are presented to the driver instead of employing conventional mirrors. For example, such a system is described in DE 19951376 A1.

These systems which employ multiple cameras are able to provide the driver with the required information about the surroundings of the vehicle; however, these solutions are very costly. As of today, separate cameras, i.e. at least two cameras employing two lenses, two housings, two image sensors, two controllers and two connectors with corresponding wiring, are necessary for surround view and mirror replacement. This leads to complex and costly solutions.

Stereo camera systems are well known in the prior art and make use of two lens units being arranged parallel to each other, see e.g. US 2010/0283837 A1 and DE 10 2013 221 581 A1. In addition, beam splitters making use of polarization filters are well known, see e.g. WO 00/72079 A2.

An electronic optical zoom system according to US 2009/0128664 A1 includes a first lens assembly and a second lens assembly. The first lens assembly and the second lens assembly may be adjacently disposed or concentrically disposed. The first lens assembly and second lens assembly, in one embodiment, have different magnification configurations. An image sensor captures electronic images of a subject. Optical zoom capability is achieved by an alterable electronic optical device, such as a switchable mirror. The alterable electronic optical device selectively redirects received light between a first optical path from a reflective surface to a second optical path from the alterable electronic optical device depending upon the state of the alterable electronic optical device. The electronic optical zoom system thereby provides optical zoom capabilities in a compact package without the need for physically moving lens assemblies.

US 2014/0132804 describes an imaging device which includes a multidirectional imaging unit defining a plurality of fields of view (FOVs), a sensor unit, and guiding optics. The multidirectional imaging unit is configured for collecting a plurality of electromagnetic (EM) radiation portions from a plurality of scenes, each scene being imaged with a respective FOV. The sensor is configured for receiving EM radiation and generating image data indicative thereof. The guiding optics is configured for receiving at least a part of the collected EM radiation portions and directing them onto the sensor unit.

U.S. Pat. No. 6,885,414 describes an optical router switch array including a plurality of switchable mirror elements having holographic liquid crystals arranged in stack cells. Each of the mirror elements is isolated electrically from the other switchable mirror elements by a plurality of substrates alternatively arranged between the switchable mirror elements. Holographic gratings are formed on the holographic liquid crystal by exposure to holography at predetermined incident angles. A single switchable mirror element can also be provided in cases where an array is not required. The switchable mirror elements are polarization insensitive, stable within the operational spectral region, and stable versus temperature.

U.S. Pat. No. 6,999,649 describes constructing a single layer polarization insensitive electrically switchable liquid crystal mirror which serves as the basic element for constructing an optical router switch array in free space as well as waveguide format. The optical router switch array includes a plurality of switchable liquid crystal mirror elements having liquid crystals arranged in stack cells and/or in a waveguide configuration. The resulted optical router switches are motionless, polarization insensitive, stable within the operational spectral region, and stable versus temperature.

An improved imaging system that requires less parts while providing high quality images is described. In particular, the known imaging systems are further developed to overcome drawbacks of the prior art.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. In one aspect, a mounting assembly for an exterior attachment device which offers particularly good protection against theft of such external attachment devices is described.

In an aspect, a first lens unit has a first optical axis and a second lens unit has a second optical axis crossing the first optical axis at a crossing point, and a transflective unit is arranged between an image sensor, the first lens unit and the second lens, preferably at the crossing point.

Here, the term "imaging system" can be used interchangeably with the term "camera", or "camera system". Also, the term "electromagnetic radiation" can be used to refer to visible light, but can also be used to refer to invisible electromagnetic radiations, such as infrared light, etc. The term "transflective unit" can be used to refer to a unit that includes at least one transflector, that can operate in a reflective mode and/or in a transmissive mode depending on a corresponding input signal that is applied to the transflective unit. The term "image sensor" can be used to refer to a device that is able to detect and convey information that constitutes an image. Also, the wording "projecting electromagnetic radiation essentially perpendicularly on the at least one image sensor" can be defined as projecting electromagnetic radiation with an incidence angle of 0° or close to 0° on the at least one image sensor.

The two lens units may be arranged not parallel to each other as known from stereo cameras, but rather such that their optical axes cross each other, with the respective crossing point being arranged in the region of the transflective unit which, therefore, is arranged between the image sensor, the first lens unit and the second lens.

The transflective unit may include at least one first shutter-glass having a reflective mode and a transmissive mode, with preferably the optical axis of the first shutter-glass crossing the first and the second optical axes in their crossing point within the first shutter-glass. For example, the shutter-glasses may include a liquid crystal layer which has the property of becoming opaque or reflective when voltage is applied, being otherwise substantially transparent.

The at least one first shutter-glass may be inclined relative to the image sensor to project electromagnetic radiation from the first lens unit on the image sensor by transmitting the electromagnetic radiation from the first lens unit, and/or to project electromagnetic radiation from the second lens unit on the image sensor by reflecting the electromagnetic radiation from the second lens unit.

The transflective unit may include a second shutter-glass, where the second shutter-glass may be arranged between the first lens unit and the first shutter-glass to control transmission of electromagnetic radiation from the first lens unit to the first shutter-glass.

The imaging system may further include a control unit, where the control unit is adapted to supply a control signal to the at least one first shutter-glass and/or to the at least one second shutter-glass.

The control signal may have a frequency, f, causing the first and second shutter-glasses to switch between a reflective and a transmissive mode.

The control signal may be adapted to simultaneously switch the first and second shutter glasses to the reflective mode and/or to the transmissive mode, or to alternately switch one shutter-glass to the reflective mode, while the other shutter-glass is switched to the transmissive mode. Here, the term "simultaneously" can be used to refer to a situation where both shutter-glasses have the same mode at the same time, i.e. both are set to reflective, or both are set to transmissive.

The imaging system may include at least one third lens unit with a third optical axis crossing the first and/or the second optical axes, preferably at a crossing point.

The first lens unit, the second lens unit and/or the third lens unit may have different field of views, preferably one of the first and second lens units having a narrow aperture, while the other lens unit having a wide aperture, preferably the first lens unit has an aperture of 40° and/or the second lens unit has an aperture of 180°, preferably the first lens unit includes a surround-view lens and the second lens unit includes a camera-monitor lens.

The first, second and/or third lens unit may include at least one optical lens each.

The first, second or third optical axis may fall together with the optical axis of the image sensor.

The imaging system may be adapted to be arranged in a camera housing.

The image sensor may include a semiconductor charge-coupled device, CCD, or an active pixel sensor.

The imaging system may further include a housing, an electronics unit, and/or a video cable.

In another aspect, a rear view display device for a vehicle, preferably for a motor vehicle, includes at least one imaging system.

In yet another aspect, a vehicle may include at least one imaging system.

At least one advantage is in providing one highly integrated camera with at least two lenses, but not in form of a stereo camera, but for a multi-view application. This leads to lower production costs, since less components need to be utilized, such as just one optical sensor, just one controller and just one electrical interface. Therefore, less wiring is needed to connect the imaging system to a main control system of a vehicle.

Also, another advantage is that projecting electromagnetic radiation from the first lens unit and/or from the second lens unit essentially perpendicularly on the at least one image sensor allows utilization of the entire sensor for information from one lens unit at certain time instances. This leads to enhanced image quality and more information (higher resolution) in the field of view of the lenses having a narrow opening angle compared to the field of view of the lenses having a wide opening angle.

The imaging system may be used for multi-view applications of the vehicle interior and rear seats as well as for obtaining further views of the vehicles trailer hitch, for bird-view applications as well as for curb stone detection. Also, the respective views can be magnified when displayed to the driver. The image system can be used for different purposes in parallel like camera monitor systems with or without detection and overlays as well as for surround view systems with or without detection and overlays.

In another aspect, an imaging system for a vehicle includes an image sensor for detecting electromagnetic radiation, a first lens unit and a second lens unit for focusing electromagnetic radiation, and at least one transflective or switchable mirror unit, with the at least one transflective or switchable mirror unit being configured to project electromagnetic radiation from at least one of the first lens unit and the second lens unit essentially perpendicularly on the image sensor, where the first lens unit has a first optical axis and the second lens unit has a second optical axis crossing the first optical axis at a crossing point, and the at least one transflective or switchable mirror unit is arranged between the image sensor, the first lens unit, and the second lens unit at the crossing point.

The at least one transflective or switchable mirror unit may be a switchable mirror unit comprising a Liquid Crystal Switchable Mirror (LCSM).

The LCSM may be configured to have two electrically manageable states, a first state having the properties of a mirror and a second state having the properties of a transparent glass.

The LCSM may include a pixilation function so that an LCSM driver unit is configured to switch each pixel on and off between the first state and the second state.

The LCSM may utilize a feedback loop so that the LCSM driver unit is configured to switch each mirror pixel to avoid intense light saturations to the image sensor and each pixel is turned on or off based on a detected amount of light saturation by the image sensor.

In another aspect, an imaging system for a vehicle includes an image sensor for detecting electromagnetic radiation, at least one lens unit for focusing electromagnetic radiation, at least one switchable mirror unit comprising a Liquid Crystal Switchable Mirror (LCSM), where the LCSM is configured to have two electrically manageable states, a first state having the properties of a mirror and a second state having the properties of a transparent glass, and the LCSM includes a pixilation function so that an LCSM driver unit is configured to switch each pixel on and off between the first state and the second state.

The LCSM may utilize a feedback loop so that the LCSM driver unit is configured to switch each mirror pixel to avoid intense light saturations to the image sensor and each pixel is turned on or off based on a detected amount of light saturation by the image sensor.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1A:
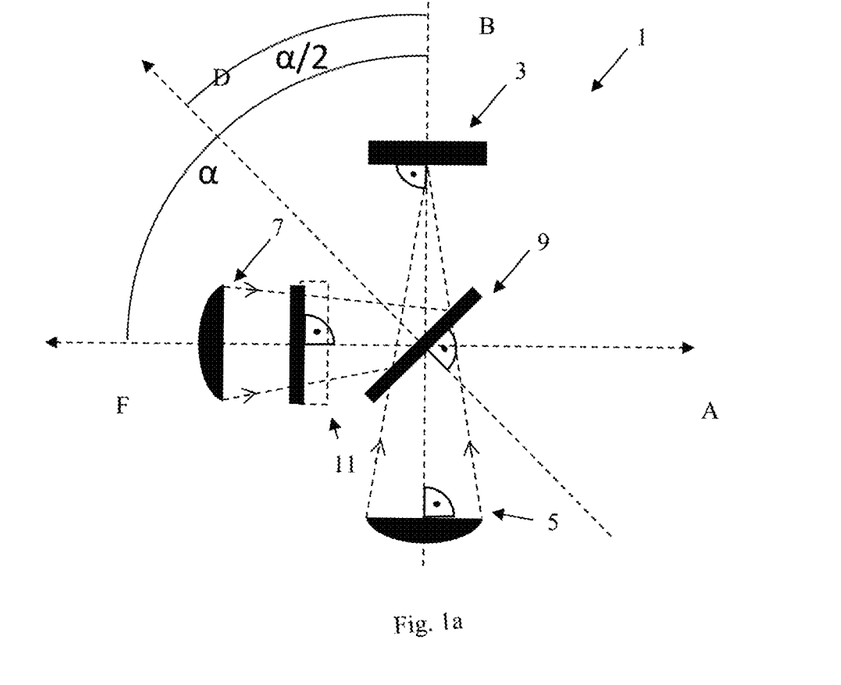
FIGS. 1a, 1b, and 1c are diagrams illustrating a schematic plan view, a schematic side view and a schematic front view of an example of an imaging system.
Figure 1B:
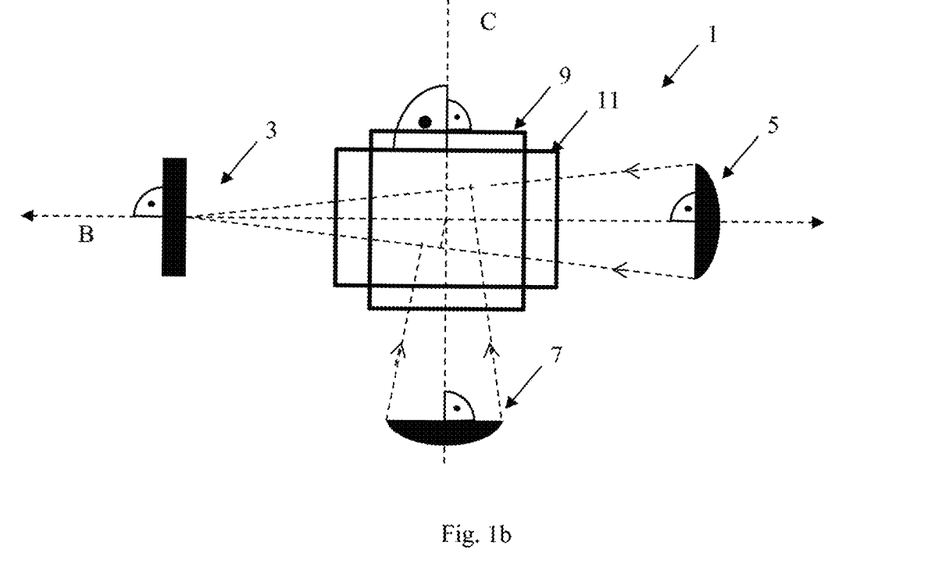
Figure 1C:
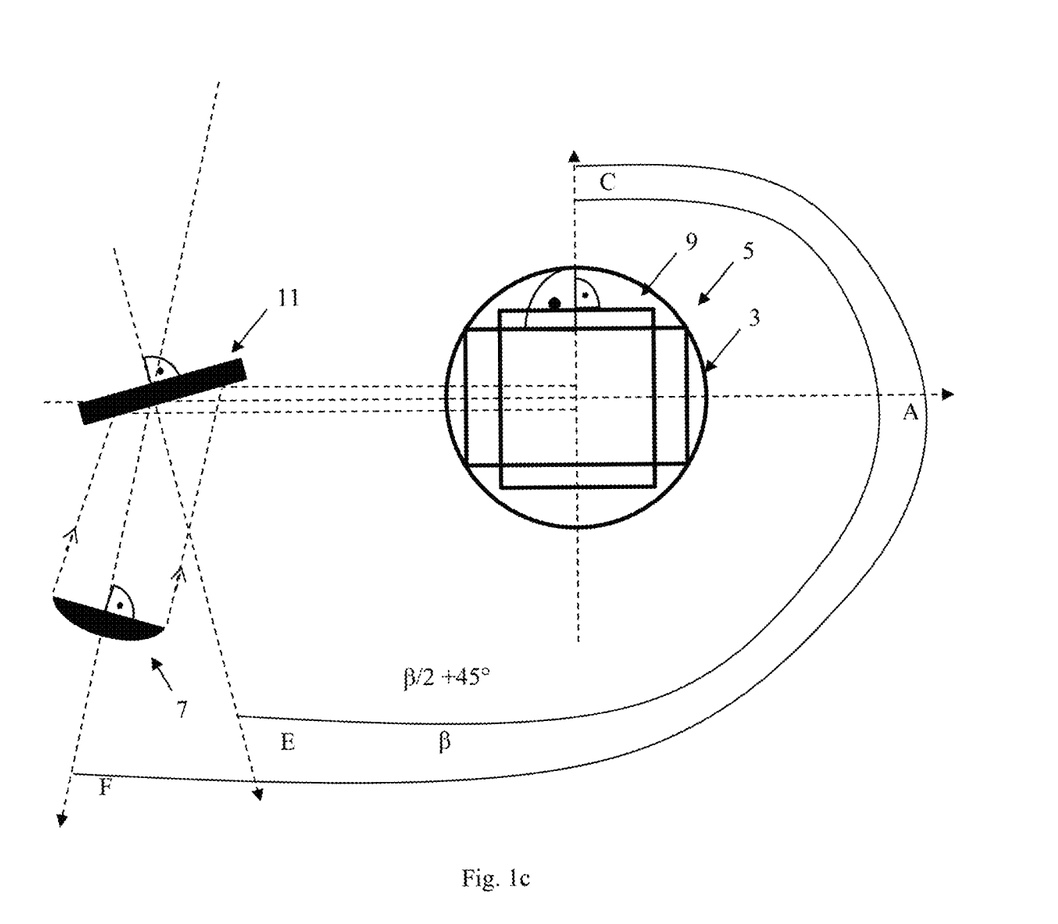

The imaging system 1, according to an embodiment and as illustrated in FIGS. 1a, 1b and 1c, includes an image sensor 3, a first lens unit 5 with a first optical axis falling together with the optical axis of the image sensor 3, a second lens unit 7 with a second optical axis running perpendicularly to the first optical axis, a first shutter-glass 9, and a second shutter glass 11. The grid system that is shown by means of dotted lines only serves for the purpose of explaining the spatial orientation of the individual components of the imaging system 1 relative to each other via the optical axes. Thereby, the axes marked A, B, and C are oriented at an angle of 90° relative to each other. In the shown embodiment, the first lens unit 5 could be a camera monitor lens having a field of view of 40°, whereas the second lens unit 7 could be a surround view lens having a field of view of 180°, or vice versa. The optical axes of the two lens units 5, 7 may cross each other within the first shutter-glass 9, namely on the optical axis of the first shutter-glass 9 as can be seen in FIG. 1a.

Thus, from FIGS. 1a and 1b it can be seen that the first lens unit 5 may be oriented opposite of the image sensor 3, i.e. oriented at an angle of 180° relative to the image sensor 3. Electromagnetic radiation that is focused by the first lens unit 5 can be projected directly onto the image sensor 3 by passing through the first shutter-glass 9 that is arranged at an angle of 45° in the optical path between the image sensor 3 and the first lens unit 5. When the first shutter-glass 9 is in a transmissive mode, the electromagnetic radiation can freely propagate through the first shutter-glass 9, whereas when the first shutter-glass 9 is in a reflective mode, an essential part of the electromagnetic radiation cannot propagate through the first shutter-glass 9. The skilled person would know that switching between the modes can be done by applying and removing an electric signal to the first shutter-glass 9.

FIGS. 1a and 1b also show that a second lens unit 7 may be arranged at an angle of a relative to the image sensor 3. In the shown embodiment, the second lens unit 7 is arranged at an angle of $\alpha=90°$ relative to the image sensor 3, where $\alpha=\angle BF$, and $\alpha/2=\angle BD$. As it can be seen from FIG. 1a, the first shutter-glass 9 is arranged at an angle of 45° relative to the second lens unit 7 and to the image sensor 3. When the first shutter-glass 9 is in the reflective mode, electromagnetic radiation from the second lens unit 7 may be reflected by the first shutter-glass 9 at an angle of 90° onto the image sensor 3.

The angle $\alpha$ can in principle take any absolute value above zero and up to 90°, i.e. the angle may vary as long as it differs from zero and allows for a crossing of the first and second optical axes.

In order to enhance the operation of the imaging system 1, a second shutter-glass 11 is shown that is arranged between the second lens unit 7 and the first shutter-glass 9. Also, in FIG. 1 a dotted line around the second shutter-glass 11 indicates that the second shutter-glass 11 could be located in an oblique plane.

Further, the second shutter-glass 11 can be switched so that the second shutter-glass 11 is in the transmissive mode when the first shutter glass 9 is also in the transmissive mode and vice versa. This allows to alternately project electromagnetic radiation substantially exclusively either from the first lens unit 5 or from the second lens unit 7 onto the image sensor 3. Correspondingly, an evaluation unit (not shown) that could be connected to the image sensor 3 could alternately obtain and evaluate image signals corresponding to the electromagnetic radiation from either the first lens unit 5 or the second lens unit 7 with a frequency f that corresponds to the switching frequency between the transmissive and reflective modes.

In FIG. 1c, a front view of the imaging system 1 is shown. In the shown embodiment, the second lens unit 7 may also be arranged at an angle $\beta$, where $\beta=\angle CF$, and $\beta/2+45°=\angle CE$. For the cases where $\alpha=180°$, the first shutter-glass 9 does not need to be employed, and where $\beta=270°$, the second shutter-glass 11 does not need to be employed. As can be seen from FIG. 1c, the second optical axes of the second lens unit 7 may cross the optical axis of the second shutter-glass 11 within the second shutter-glass 11.

Figure 2:
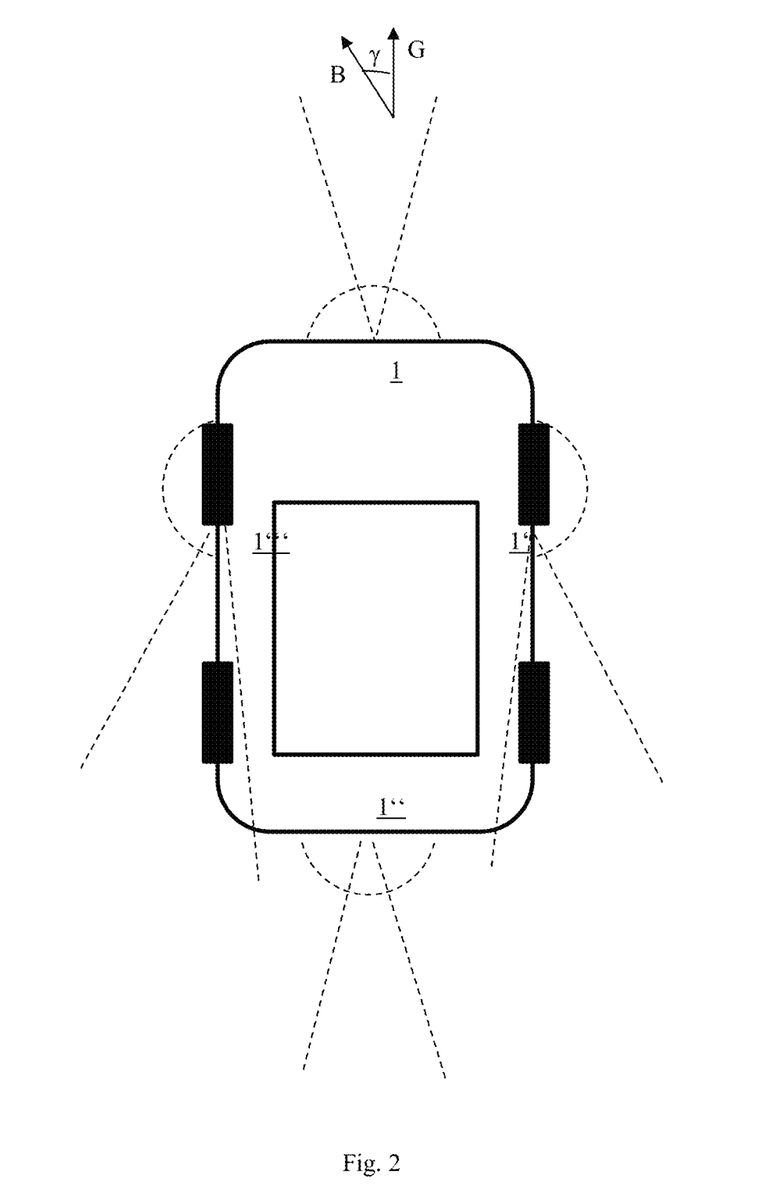
FIG. 2 is a diagram illustrating a schematic view of an example of a vehicle having imaging systems installed in various locations.

In FIG. 2, a schematic view of a vehicle is shown having four imaging systems 1, 1', 1", 1'" according to embodiments installed in various locations. In the shown embodiment, the first lens unit 5 of the imaging systems 1, 1', 1", 1'" may be a camera monitor lens having a field of view of 40°, whereas the second lens unit 7 may be a surround view lens having a field of view of 180°. The imaging systems 1, 1', 1", 1'" could be all of the type of imaging system 1 that are shown in FIGS. 1a, 1b, and 1c. For example, the driving direction may be depicted above imaging system 1 by means of an arrow G for the shown imaging systems 1, 1', 1", 1'". The orientation angle of the camera monitor lens may be depicted by γ, where γ=∠GB and the wedge shaped dotted lines indicate the viewing angle of the camera monitor lens, whereas the viewing angle of the surround view lens is depicted by the dotted half circle.

In the shown example, imaging system 1 may be configured so that α=180°, β=225°, γ=0°, imaging system 1' may be configured so that α=320°, β=225°, γ=+15°, imaging system 1" may be configured so that α=180°, β=225°, γ=180°, and imaging system 1' may be configured so that α=60°, β=225°, γ=−15°.

However, the skilled person would know that more or less imaging systems 1, 1', 1", 1'" could be installed on the exterior or interior of the vehicle.

Figure 3:
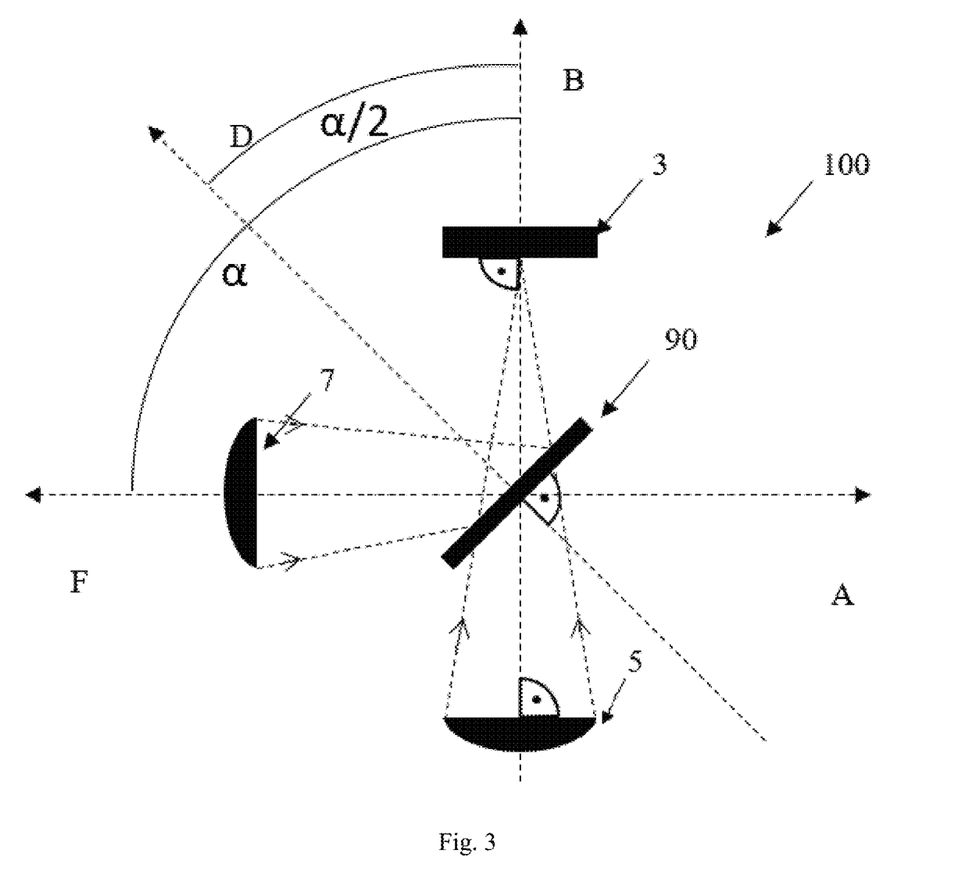
FIG. 3 is a diagram illustrating a schematic plan view of another example of an imaging system using a liquid crystal switchable mirror.

Referring to FIG. 3, the imaging system 100 is similar to the imaging system 1 of FIGS. 1a-1c including the image sensor 3, the first lens unit 5, the second lens unit 7, the reference axes A, B, D, and F, and the reference angle α. For this imaging system 100, a switchable mirror unit such as an Liquid Crystal Switchable Mirror (LCSM) 90 is used for merging two optical paths instead of the transflective unit with its first and second shutter glasses 9, 11 of the imaging system 1. The LCSM 90 of this example may have two electrically manageable states. One state has the properties of a mirror and the other state of a transparent glass. In this example, the LCSM 90 may include, but does not need to include, a pixilation function so that a LCSM driver unit may be configured to switch each pixel on and off between the transparent and reflective modes. In addition, a feedback loop may be employed by the LCSM driver unit to switch each mirror pixel to avoid intense light saturations to the sensor—that is, the turning on and off of each pixel may be based on a detected amount of light saturation by the sensor. Example optical switches which can be used by the LCSM 90 are described in U.S. Pat. Nos. 6,885,414 and 6,999,649.

In the example of FIG. 3, the use of Liquid Crystals with bound reflective elements as a switchable mirror enables merging of the two shutter-glasses 9, 11 into one and all together replacing the transflective element of the imaging system 1 of FIGS. 1a-1c. This configuration optimizes the switching time between the two paths by the use of one combined element—the LCSM 90—rather than the two shutter glasses, and doubles the amount of electromagnetic radiation reaching the sensor by removing the transflective element.

The imaging system 100 may be used in a spectral range from 400 to 3.600 nanometers, may have a size from 5×5 millimeters to 1.000×1.000 millimeters and may operate in temperatures from −10 to 70° C., while other ranges are also possible.

The LCSM 90 may have a reflection coefficient in the reflective state of more than 87% and a transmission in the reflection sate of less than 0.7%. The switching time between the reflective state and the transmissive state may be 10 milliseconds, with a switching voltage of 100 to 260 V/20 Hz. However, it should be appreciated that any other parameters may be used.

Figure 4:
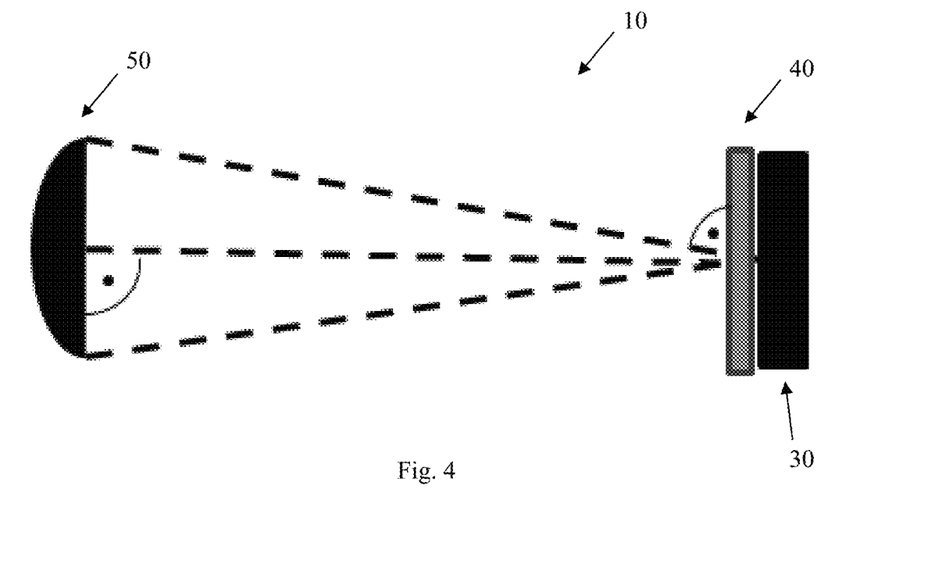
FIG. 4 is a diagram illustrating a schematic plan view of yet another example of an imaging system using a pixelated liquid crystal switchable mirror and an objective lens.

FIG. 4 is a diagram illustrating a schematic plan view of yet another example of an imaging system 10 using a pixelated LCSM 40 and an objective lens 50. In this example, it is preferred that the LCSM 40 is pixelated in order to avoid intense light saturation to the sensor 30. A pixilation function may be enabled by an LCSM driver unit configured to switch each pixel on and off between the transparent and reflective modes. In addition, a feedback loop may be employed by the LCSM driver unit to switch each mirror pixel to avoid intense light saturations to the sensor—that is, the turning on and off of each pixel may be based on a detected amount of light saturation by the sensor. As with the LCSM 90 of FIG. 3, example optical switches which can be used by the LCSM 40 are described in U.S. Pat. Nos. 6,885,414 and 6,999,649. In this example, only one objective lens 50 is used in the imaging system 10 but it may be appreciated more than one lens can also be used. The sensor 30 may also be pixelated with a similar surface as the LCSM 40, but does not need to be. In an example, the pixel size may be 30 micrometers; however, it should be appreciated that any other pixel size may be used.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGNS 1, 1', 1", 1'" imaging system
3 image sensor
5 first lens unit
7 second lens unit
9 first shutter-glass
11 second shutter-glass
A, B, C, D, E, F, G reference axes
α, β, γ reference angles
10 imaging system
30 sensor
40 pixelated LCSM
50 lens unit
90 LCSM
100 imaging system

What is claimed is:

1. A rear view display device for a vehicle, comprising:
at least one imaging system for a vehicle, comprising:
an image sensor for detecting electromagnetic radiation;
a first lens unit and a second lens unit for focusing electromagnetic radiation; and
at least one transflective or switchable mirror unit, with the at least one transflective or switchable mirror unit being configured to project electromagnetic radiation from at least one of the first lens unit and the second lens unit essentially perpendicularly on the image sensor,
wherein the first lens unit has a first optical axis and the second lens unit has a second optical axis crossing the first optical axis at a crossing point,
the at least one transflective or switchable mirror unit is arranged between the image sensor, the first lens unit, and the second lens unit at the crossing point, wherein the at least one transflective or switchable mirror unit is a switchable mirror unit comprising a Liquid Crystal Switchable Mirror (LCSM), wherein the LCSM is configured to have two electrically manageable states, a first state having the properties of a mirror and a second state having the properties of a transparent glass, wherein the LCSM includes a pixilation function sp that an LCSM driver unit is configured to switch each pixel on and off between the first state and the second state, and wherein the LCSM utilizes a feedback loop so that the LCSM driver unit is configured to switch each mirror pixel to avoid intense light saturations to the image sensor and each pixel is turned on or off based on a detected amount of light saturation by the image sensor.

2. The rear view display device of claim 1, wherein the at least one transflective or switchable mirror unit is a transflective unit comprising:
   at least one transflector that can operate in at least one of a reflective mode and a transmissive mode depending on a corresponding input signal that is applied to the at least one transflective unit;
   at least one first shutter-glass having a reflective mode and a transmissive mode, with the optical axis of the at least one first shutter-glass crossing the first and the second optical axes in the crossing point within the at least one first shutter-glass; and
   at least one second shutter-glass, the at least one second shutter-glass being arranged between the first lens unit and the at least one first shutter-glass to control transmission of electromagnetic radiation from the first lens unit to the at least one first shutter-glass.

3. The rear view display device of claim 2, wherein the at least one first shutter-glass is inclined relative to the image sensor in order to at least one of project electromagnetic radiation from the first lens unit on the image sensor by transmitting the electromagnetic radiation from the first lens unit, and project electromagnetic radiation from the second lens unit on the image sensor by reflecting the electromagnetic radiation from the second lens unit.

4. The rear view display device of claim 2, further comprising a control unit, wherein the control unit is adapted to supply a control signal to at least one of the at least one first shutter-glass and the at least one second shutter-glass.

5. The rear view display device of claim 4, wherein the control signal has a frequency, f, causing the first and second shutter-glasses to switch between a reflective and a transmissive mode.

6. The rear view display device of claim 5, wherein the control signal is adapted to simultaneously switch the at least one first and at least one second shutter glasses to the reflective mode or to the transmissive mode, or to alternately switch one of the at least one first and at least second shutter glasses to the reflective mode, while the other of the at least one first and at least second shutter glasses is switched to the transmissive mode.

7. The rear view display device of claim 1, further comprises at least one third lens unit with a third optical axis crossing at least one of the first and the second optical axes at the crossing point.

8. The rear view display device of claim 7, wherein at least one of the first lens unit, the second lens unit, and the third lens unit have different field of views, wherein one of the first and second lens units have a narrow aperture while the other has a wide aperture, at least one of the first lens unit has an aperture of 40° and the second lens unit has an aperture of 180°, and the first lens unit comprises a surround-view lens and the second lens unit comprises a camera-monitor lens.

9. The rear view display device of claim 7, wherein at least one of the first, the second, and the third lens unit comprise at least one optical lens.

10. The rear view display device of claim 7, wherein the first, the second, or the third optical axis falls together with the optical axis of the image sensor.

11. The rear view display device of claim 1, wherein the imaging system is adapted to be arranged in a camera housing.

12. The rear view display device of claim 1, further comprising a semiconductor charge-coupled device (CCD), or an active pixel sensor.

13. The rear view display device of claim 1, further comprising at least one of a housing, an electronics unit, and a video cable.

14. A vehicle, comprising at least one rear view display device of claim 1.

15. An imaging system for a vehicle, comprising:
   an image sensor for detecting electromagnetic radiation;
   at least one lens unit for focusing electromagnetic radiation; and
   at least one switchable mirror unit comprising a Liquid Crystal Switchable Mirror (LCSM),
   wherein the LCSM is configured to have two electrically manageable states, a first state having the properties of a mirror and a second state having the properties of a transparent glass,
   the LCSM includes a pixilation function so that an LCSM driver unit is configured to switch each pixel on and off between the first state and the second state, and
   wherein the LCSM utilizes a feedback loop so that the LCSM driver unit is configured to switch each mirror pixel to avoid intense light saturations to the image sensor and each pixel is turned on or off based on a detected amount of light saturation by the image sensor.

* * * * *